(12) United States Patent
Wabnig

(10) Patent No.: US 10,097,526 B2
(45) Date of Patent: Oct. 9, 2018

(54) KEY DISTRIBUTION IN A WIRELESS SYSTEM

(71) Applicant: Nokia Technologies Oy, Espoo (FI)

(72) Inventor: Joachim Wabnig, Upper Cambourne (GB)

(73) Assignee: Nokia Technologies Oy, Espoo (FI)

( * ) Notice: Subject to any disclaimer, the term of this patent is extended or adjusted under 35 U.S.C. 154(b) by 51 days.

(21) Appl. No.: 15/113,927

(22) PCT Filed: Feb. 14, 2014

(86) PCT No.: PCT/IB2014/058998
§ 371 (c)(1),
(2) Date: Jul. 25, 2016

(87) PCT Pub. No.: WO2015/121709
PCT Pub. Date: Aug. 20, 2015

(65) Prior Publication Data
US 2016/0344714 A1   Nov. 24, 2016

(51) Int. Cl.
| | |
|---|---|
| *G06F 9/00* | (2006.01) |
| *H04L 29/06* | (2006.01) |
| *H04B 10/70* | (2013.01) |
| *H04L 9/08* | (2006.01) |
| *H04B 1/3827* | (2015.01) |
| *H04B 10/27* | (2013.01) |

(52) U.S. Cl.
CPC ......... *H04L 63/062* (2013.01); *H04B 1/3827* (2013.01); *H04B 10/27* (2013.01); *H04B 10/70* (2013.01); *H04L 9/0858* (2013.01); *H04L 63/061* (2013.01)

(58) Field of Classification Search
CPC .................................................... H04L 9/0852
See application file for complete search history.

(56) References Cited

U.S. PATENT DOCUMENTS

| | | | |
|---|---|---|---|
| 5,999,285 A | 12/1999 | Brandt et al. | ................. 359/112 |
| 2002/0002679 A1* | 1/2002 | Murakami | ............ G06K 9/522 |
| | | | 713/176 |
| 2003/0151720 A1* | 8/2003 | Chernyak | ............ A61B 3/1015 |
| | | | 351/206 |
| 2006/0093376 A1 | 5/2006 | Mitchell et al. | .............. 398/183 |

(Continued)

FOREIGN PATENT DOCUMENTS

| | | |
|---|---|---|
| CN | 101053186 A | 10/2007 |
| CN | 102171952 A | 8/2011 |

(Continued)

OTHER PUBLICATIONS

Laing et al., "Reference Frame Independent Quantum Key Distribution", Phys. Rev. A 82/ Quantum Physics, Mar. 4, 2010, pp. 1-5.

(Continued)

*Primary Examiner* — Josnel Jeudy
(74) *Attorney, Agent, or Firm* — Harrington & Smith

(57) ABSTRACT

Distribution of a key in a wireless system comprising at least one mobile device is disclosed. Data regarding relative rotation between devices in optical data communications for key distribution is determined. The determined data is taken into account in determining how to use the optical data communications for establishing a key.

18 Claims, 6 Drawing Sheets

(56) References Cited

U.S. PATENT DOCUMENTS

| | | | |
|---|---|---|---|
| 2007/0025551 A1* | 2/2007 | Harrison | G06Q 20/367 380/256 |
| 2009/0310784 A1 | 12/2009 | Duligall et al. | |
| 2010/0080394 A1 | 4/2010 | Harrison et al. | |
| 2012/0039617 A1 | 2/2012 | Duligall et al. | |
| 2012/0164680 A1* | 6/2012 | McNaughton | C12M 41/36 435/32 |
| 2012/0195430 A1* | 8/2012 | Niskanen | H04L 9/0852 380/256 |
| 2013/0016835 A1 | 1/2013 | Zbinden et al. | |
| 2013/0101121 A1* | 4/2013 | Nordholt | H04L 9/0852 380/279 |
| 2013/0251145 A1* | 9/2013 | Lowans | H04L 9/0838 380/44 |
| 2015/0249537 A1* | 9/2015 | Wabnig | H04B 10/70 380/256 |
| 2017/0019252 A1* | 1/2017 | Bitauld | H04B 10/70 |

FOREIGN PATENT DOCUMENTS

| | | |
|---|---|---|
| GB | 2427317 | 12/2006 |
| GB | 2460252 | 11/2009 |
| JP | 2008-199263 A | 8/2008 |
| JP | 2010-028493 A | 2/2010 |
| WO | 03075491 | 9/2003 |
| WO | WO-2007/041096 A2 | 4/2007 |
| WO | 2011014184 | 2/2011 |
| WO | 2013/179094 A1 | 12/2013 |

OTHER PUBLICATIONS

Sheridan et al., "Finite-Key Security Against Coherent Attacks in Quantum Key Distribution", New Journal of Physics, vol. 12, Dec. 9, 2010, pp. 1-12.

Spedalieri, "Quantum Key Distribution Without Reference Frame Alignment: Exploiting Photon Orbital Angular Momentum", Feb. 1, 2008, pp. 1-4.

Niauerth, "Air to Ground Quantum Key Distribution", Dissertation, Jul. 2013, 119 pages.

Toyoshima et al., "Polarization-Basis Tracking Scheme in Satellite Quantum Key Distribution", International Journal of Optics, vol. 2011, Apr. 6, 2011, pp. 1-8.

Extended European Search Report received for corresponding European Patent Application No. 14882208.3, dated Sep. 18, 2017, 6 pages.

International Search Report and Written Opinion received for corresponding Patent Cooperation Treaty Application No. PCT/IB2014/058998, dated Nov. 19, 2014, 15 pages.

Wabnig J. et al. Demonstration of free-space reference frame independent quantum key distribution, New Journal of Physics, vol. 15, pp. 1-7, Publication date: Jul. 2, 2013.

Office action received for corresponding Japanese Patent Application No. 2016-551838, dated Nov. 7, 2017, 3 pages of office action and 8 pages of office action translation available.

* cited by examiner

KEY DISTRIBUTION IN A WIRELESS SYSTEM

RELATED APPLICATION

This application was originally filed as PCT Application No. PCT/IB2014/058998 filed Feb. 14, 2014.

FIELD OF THE DISCLOSURE

This disclosure relates to wireless communications and more particularly to key distribution in a system comprising at least one mobile device.

BACKGROUND

Mobile devices can be used for wireless communication and various computing tasks. For example, use of mobile devices with wireless connectivity such laptops, tablets, smart mobile phones and so on is well established. Wireless communications can be provided between mobile user devices and access points such as base stations, servers, machine type devices and so on. Communications can also be provided between mobile devices.

Data transmissions between parties may need to be secured. Various applications for example banking, shopping, email and so on, may rely on secure transactions over the Internet, other networks or interfaces open to attacks. Increase in Internet commerce and transfer of computing tasks to remote servers (e.g. "cloud computing") has emphasized the need to maintain appropriate security of communications. Security can be provided based on a cryptographic protocol. Current cryptographic schemes (e.g. public key encryption) rely on the hardness of solving certain mathematical problems. For example, the commonly used RSA encryption algorithm is based on the hardness of factoring a large number into its prime factors. This is a hard problem using standard computer technology but can become solvable with development of more powerful computing technologies, for example by a future quantum computer, Hence new technologies for securing communications are being studied. One possible solution is based on quantum mechanics and more particularly quantum key distribution (QKD).

In the context of mobile communications an issue may arise in that the mobile devices are often handheld or otherwise portable or can otherwise move during communications. Thus, although the other party may be fixed the location and/or position of the mobile device might not be known, and may change during communications.

It is noted that the above discussed issues are not limited to any particular communication environments and apparatus but may occur in any context where security is needed for communications where at least one party is anyhow moving.

Embodiments of the invention aim to address one or several of issues when quantum cryptography is applied to mobile devices,

SUMMARY

In accordance with an embodiment there is provided a method for key distribution comprising initiating optical data communications between devices for key distribution, determining data regarding relative rotation between the devices, and taking the determined data into account in determining how to use the optical data communications for establishing a key.

In accordance with an embodiment there is provided an apparatus for key distribution between devices configured for optical data communications, the apparatus comprising at least one sensor configured to determine information for determining relative rotation between the devices, and at least one processor configured to take the determined relative rotation into account in determining how to use the optical data communications for establishing a key.

Information of the relative rotation may be determined by one or both of the devices.

In accordance with a more specific aspect at least one of the devices is a mobile device.

The method and apparatus may be provided in the transmitting and/or receiving device.

In accordance with a more specific aspect rotation of a reference frame around an axis connecting the devices is determined. The relative rotation between the devices is determined based on the determined rotation of the reference frame.

In accordance with a more specific aspect information based on at least one measurement for determining the relative rotation is communicated between the devices by at least one of the devices.

Bits from the optical data communications may be selected at least in part based on the determined data. Only bits received within a certain interval or intervals of rotational angles may be selected.

In accordance with an aspect determined rotation data is recorded into data bins. Raw key bits and/or check bits can be selected based on the data in the bins.

According to another aspect data regarding the relative rotation between the devices is determined continuously. An estimate for the relative rotation with a confidence interval can be determined based on measurements by at least one of the devices. The lowest possible key rate within the confidence interval can be determined. The determined lowest possible key rate may be used for security proof.

The optical data communications for key distribution may comprise communication of photons for quantum key distribution.

A mobile device arranged to implement the embodiments may also be provided.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

BRIEF DESCRIPTION OF FIGURES

Embodiments will now be described in further detail, by way of example only, with reference to the following examples and accompanying drawings, in which.

DESCRIPTION OF CERTAIN EXAMPLES

Figure 1:
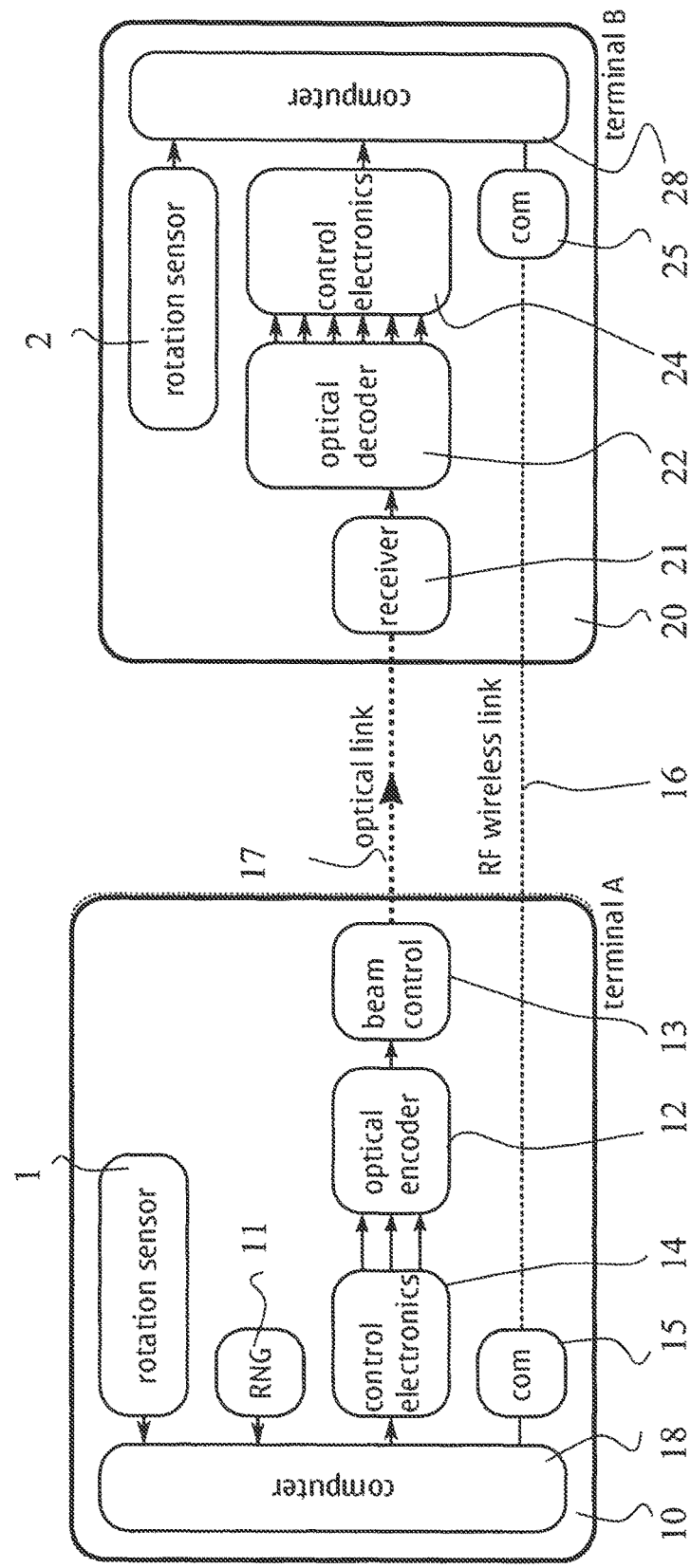
FIG. 1 shows a schematic diagram of two devices in communications in accordance with an embodiment.

In the following certain exemplifying embodiments are explained in the context of wireless or mobile communications where secure communications are provided for communicating devices where at least one of the devices is a mobile communication device. A mobile device of a user for communications is often referred to as user equipment (UE) or mobile terminal. A mobile device may be provided by any device capable of sending wireless signals to and/or receiving wireless signals on a wireless channel. The mobile device is also provided with apparatus for communication on an optical channel. Non-limiting examples of mobile devices include a mobile station (MS) such as a mobile phone or what is known as a 'smart phone', a portable computer such as a laptop, tablet or a personal data assistant (PDA) provided with wireless communication capabilities, or any combinations of these or the like. An appropriate mobile device is provided with at least one data processing entity, at least one memory, and other possible components for use in software and hardware aided execution of tasks it is designed to perform, including control of communications with other parties and features relating to secure communications. The data processing, storage and other relevant control apparatus can be provided on an appropriate circuit board and/or in chipsets.

Quantum key distribution (QKD) can be used for securing the communications. Cryptographic schemes that use properties of quantum mechanical systems to distribute a secure key are considered as providing high levels of security. For example, the current thinking is that even a powerful eavesdropper who would only be limited by the laws of physics should not be able to compromise the security of the scheme. Implementations of quantum key distribution schemes rely on sending single photons between two terminals.

An example of a possible use of QKD is where a handheld mobile device establishes a shared key with a stationary terminal. It is also possible that both of the terminals are mobile. Other types of quantum key distribution systems, for example those for satellite/airplane/balloon to ground communications are also possible.

In a quantum key distribution scheme between two devices a common reference frame can be used by the communicating devices for improving reliability and efficiency. To provide the reference frame the devices need to be aligned. This can be challenging if at least one of the terminals is anyhow moving. Key distribution times with current technology are typically in the order of 100 ms to 1 s. Rotational movement of at least one mobile device is likely to occur during this period. Using currently existing standard techniques the key rate decreases with increasing motion. This is so because a finite number of bits (typically >100,000) needs to be communicated to establish a secure key. If the reference frame changes during the transmission different bits are likely to have a different reference frame. Averaged over all bits necessary for establishing a secure key this rotation shows up as an error. This decreases the achievable secure key rate, and may even make key distribution altogether impossible.

An exemplifying system enabling efficient quantum key distribution for non-stationary reference frames is now described with reference to FIG. 1. The system comprises a sender device 10, labelled terminal A, and a recipient device 10, labelled terminal B. In accordance with an embodiment terminal A comprises a mobile device, for example a mobile phone or a smartphone, a laptop, a notebook, a tablet computer and so forth. Terminal B may comprise a fixed node, for example a base station of a cellular system or a local network system, or a machine type terminal, In FIG. 1 a radio frequency (RE) wireless link 19 is provided between devices 10 and 20. Both devices are provided with a communications subsystem for the wireless communications, for example appropriate radio apparatus 15 and 25, respectively, to facilitate wireless communications on link 16. It is noted that a wireless channel between the devices can also be provided based on other technologies, such as via an optical link.

Distribution of keys between devices 10 and 20 is based on sending of photons from device 10 to device 20 over optical link 17. In accordance with an embodiment single photons are sent. Apparatus for generating and emitting the photons can comprise an optical encoder 12 emitting single photons, a beam controller 13 which allows directing the photons towards the recipient device, control electronics 14 for creating the electrical pulses needed to emit single photons, a (quantum) random number generator 11, and a processor apparatus 18 for controlling these components. The apparatus 12 for optical encoding can be adapted to probabilistically convert light pulses emitted appropriate light source or sources. For example three light sources may be used to produce single photons polarised in three possible polarisations, each light source corresponding to one polarisation.

Terminal 20 can comprise a receiver 21 that is able to receive the optical beam from terminal 10. An optical decoder 22 capable of detecting single photons can be provided. Control electronics 24 adapted for processing detector outputs and record their time trace, a communications subsystem 25 for the wireless communication, and a computer or processor 26 for controlling the above components are also shown.

Apparatus for determining relative orientation of the devices is provided. For this purposes at least one of the communication devices is provided with orientation sensing device, and thus FIG. 1 shows rotation sensor 1 of the sender terminal device 10 and rotation sensor 2 of the receiver terminal device 20. The rotation angle can be deduced from sensor data coming from one or several sensors. The sensor device can provide information about the rotation of the reference frame e.g. by means of an accelerometer, magnetometer and/or gyroscope.

A measurement using e.g. accelerometer and gyroscope data can be used to determine the orientation of a device relative to a reference frame. To provide data about rotation relative to the other device based on a reference frames the measurement can take place in both devices, When both devices determine their orientation to a reference frame they are able to deduce their relative rotation to each other from that information. Communication of information of the determined rotational position to the reference frame is communicated between the devices to establish their relative orientation. Alternatively, a method to measure the relative orientation directly can be used. In this alternative it can be sufficient to record the relative orientation only in one device. This may be provided e.g. based on imaging system or the like capable of determining the relative rotation between the devices based on analysing information captured from the other device.

Also, if one of the devices is stationary with a known orientation in space (e.g. attached fixedly to a solid base)

only one of the devices may need to be arranged to measure the rotation. if both devices can move then determination of rotation is advantageously provided at both devices.

In accordance with an example a device is configured to record rotation of a reference frame during a key distribution attempt. An algorithm adapted to establish security of the cryptographic link in at least one of the devices can be adapted to use determined rotation data. If one of the terminals involved in quantum key distribution (QKD) is mobile or both terminals are mobile the relative rotation angle of the two terminals around the axis connecting the two terminals can be recorded. The recorded data can be used by the algorithm adapted to operate e.g. in accordance with one of the below described possible modes of operation.

The rotational data can be used in transmitter and/or receiver involved in the key distribution, the manner of usage depending on the cryptographic scheme.

In accordance with an example of a possible use of the rotation data for QKD a so called binned mode of operation is provided. Binning refers to operation where, when the relative rotational angle falls in a given interval or intervals, i.e. the bin or bins, the corresponding data bits are used in the security proof.

In a possible operation according to the binned mode raw key and check bits are selected based on recorded rotation data. The additional information about the relative rotation between the devices during the key distribution attempt can be used for example such that those bit sequences that shall enter the calculation of the secure key rate are selected in such a way that they lie within narrow intervals of rotation angles. That is, only bits that lie within a given interval or intervals are used for establishing a key.

The binned mode can be used with different key distribution schemes, for example BB84 protocol, and reference frame independent quantum key distribution, or e.g. schemes using three polarization states. In schemes that tolerate a static but arbitrary reference frame rotation N intervals distributed around 180 degrees can be used to establish N independent keys. N can be selected to be e.g. around 30.

Figure 2:
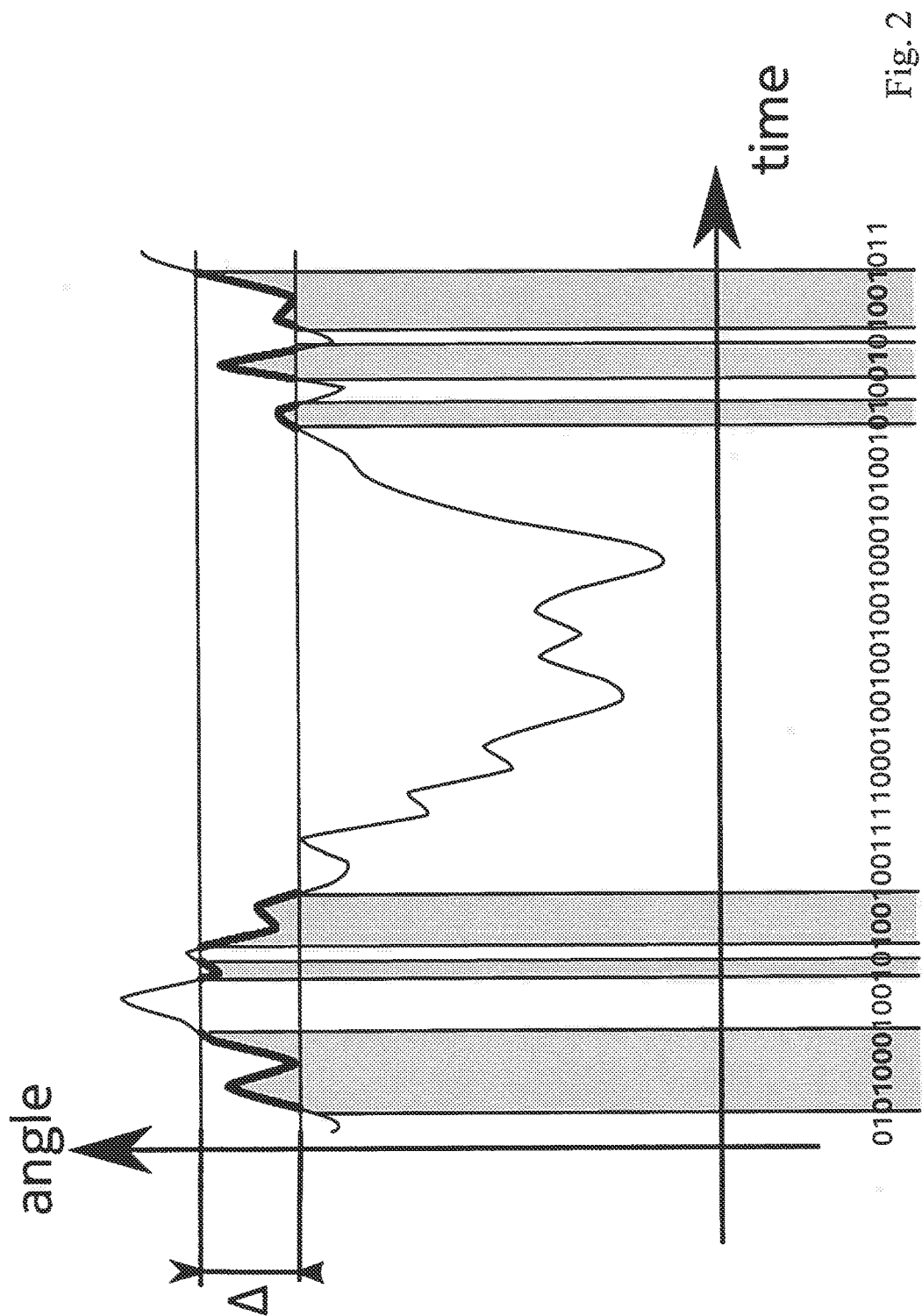
FIG. 2 shows an example of an acceptance interval of a rotation angle for key distribution.

Therefore, instead of using all raw key bits and check bits for the key, a selection process is provided where only bits measured when the relative rotation angle between the terminals was within a given interval are selected to be either raw key bits or check bits. An example for a given interval Δ is shown in FIG. 2. More particularly, only bits that were sent/detected when the relative rotation angle of sender terminal and receiver terminal was within the interval Δ are used and thus only those bits contribute to the raw key and check bits. The contributing bits are emphasised in bold in the stream of bits.

Figure 3:
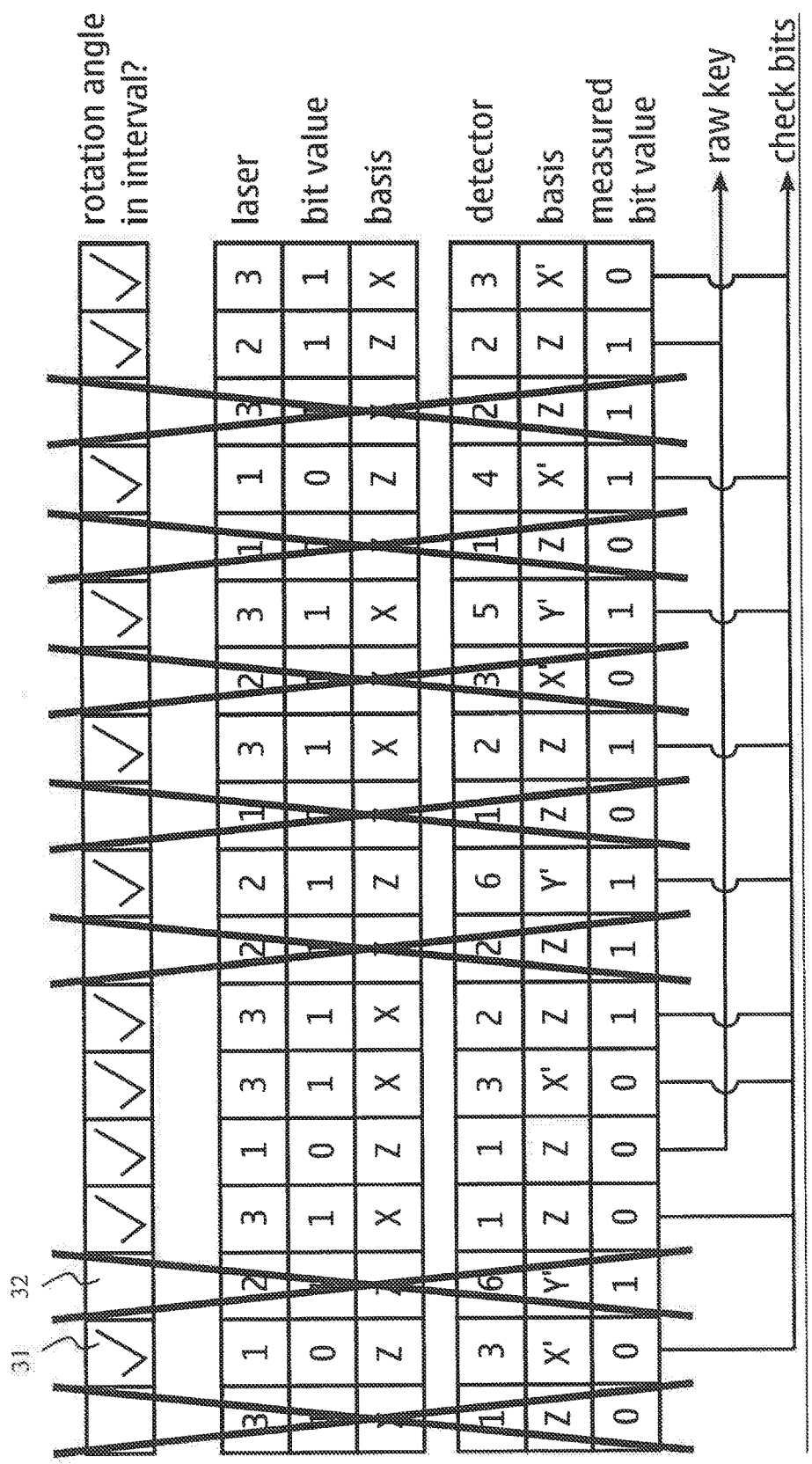
FIG. 3 shows key sifting process with selective bit selection.
Figure 4:
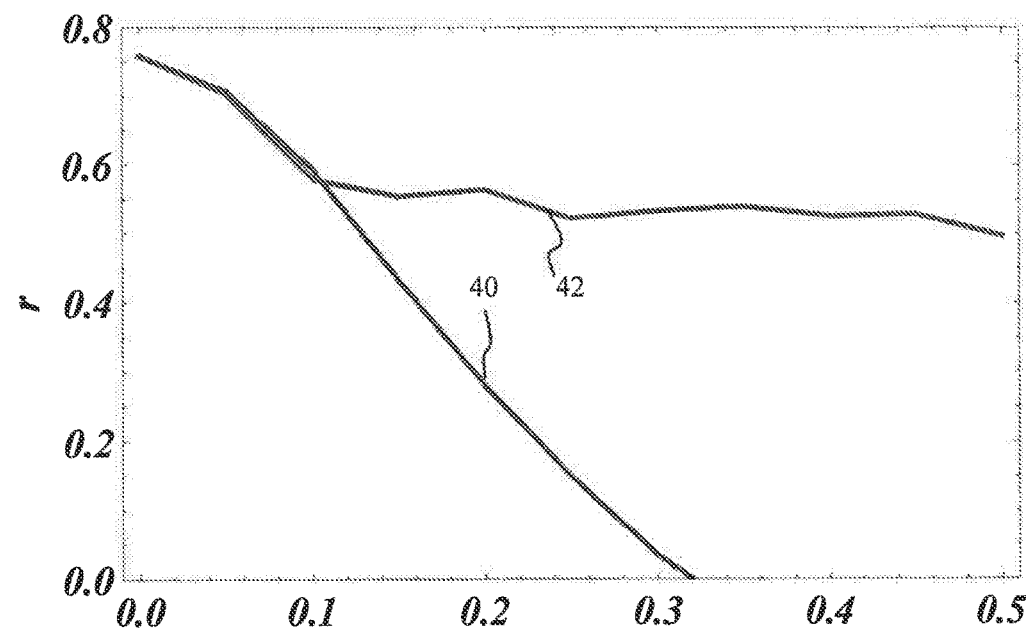
FIG. 4 shows comparison of key rates obtained with and without selective bit selection.

FIG. 3 illustrates an example of modified key sifting process, e.g. of a protocol using three polarisation states to produce raw key and check bits. Only bits where the rotation angle was in the acceptance interval are used for the raw key and check bits. These bits are designated by reference 31. Bits 32 that are outside are ignored, this being illustrated by the cross-oven A benefit of use of the binned mode can be demonstrated for a constantly increasing rotation angle (constant angular velocity). With the currently used protocols the key rate is expected to decrease as the angular velocity increases. Instead of this, the binning mode provides a finite key rate. This is illustrated by FIG. 4 showing in a way of computer simulation secret key fraction obtained with a Reference Frame Independent (RFI) QKD protocol in the case of constant rotation velocity of two reference frames. Line 40 shows the key rate when using all samples in one bin. As shown, when the angular velocity becomes high enough the key rate drops to zero. Line 42 shows the key rate considered possible when binning mode is used with four evenly sized bins between 0 and 180 degrees. In this case the key rate appears to stay finite.

Figure 5:
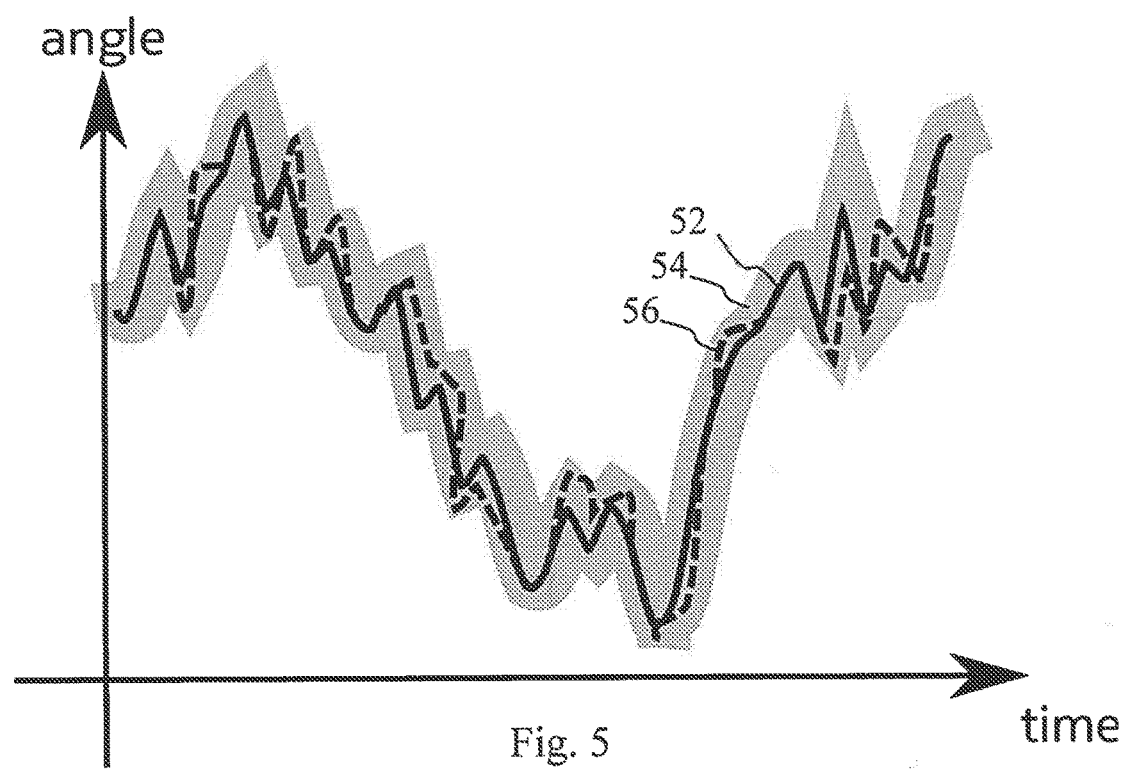
FIG. 5 shows different possible path with confidence interval around measured rotation angle.

In accordance with another example is a mode where full recording of the rotation angle of a terminal is used as a basis for a security proof. This mode will be referred herein as continuous mode. In this mode measurements of the relative rotation angle are used to provide an estimate for the rotational angle between the devices with a certain confidence interval. FIG. 5 shows a graphical presentation of relative rotation angle between two devices as a function of time. The angle as obtained by the measurements is shown by the continuous line 52. At any time there is a most likely value for the rotation angle and an interval in which the value lies with a certain probability, for example say 99.99%, from the measured value. The confidence interval around the measured values or path 52 is shown by grey shading 54. The dashed line 56 depicts possible rotation traces within the confidence interval. The paths within the confidence interval are all possible paths, that is paths that are consistent with the measurement, In a security proof the lowest possible key rate consistent with the measured data is looked for. Due to the uncertainty in the measurement data not only the estimated path, but all paths within the confidence interval 54 are possible and are therefore examined. It may not always be immediately obvious which would be the path with the lowest key rate. The optimal path this can be determined as a part of an optimisation procedure.

The path that results the lowest key rate is used for the security proof. This is beneficial e.g. in QKD since in determining a QKD security proof one shall assume the worst case scenario. For example, if there is a number of paths within a confidence interval then all these paths are possible and if the possible path that gives the lowest key rate is not selected a portion of the secret key may be given away, meaning that more bits of the key is used than should be.

Figure 6:
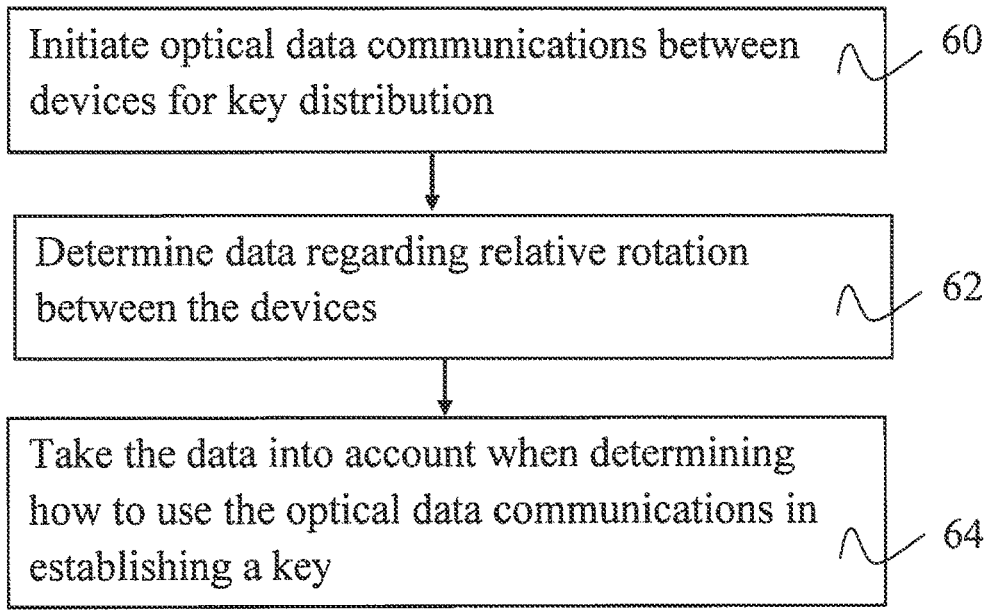
FIGS. 6 to 8 are flowcharts in accordance with certain embodiments.

FIG. 6 shows a method for key distribution comprising initiating at 60 optical data communications between two devices for key distribution and determining at 62 data regarding relative rotation between the devices. The determined data is taken into account at 64 in determining how to use the optical data communications for establishing a key.

Figure 7:
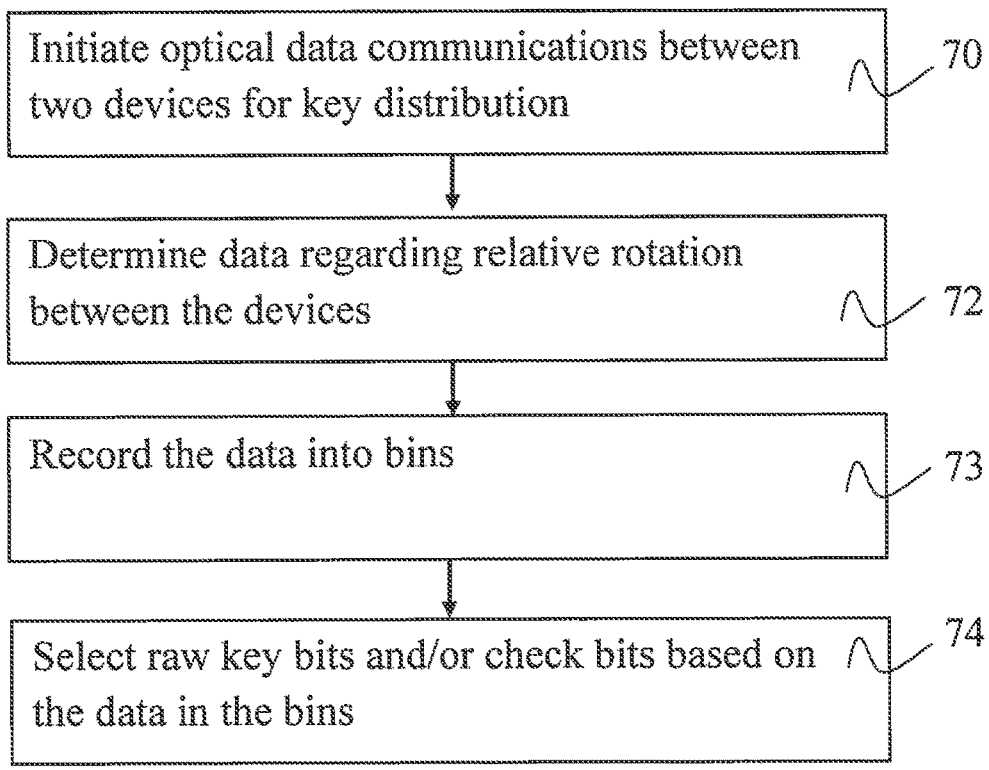

FIG. 7 shows a flowchart for an example of the binning mode. Initiating at 70 optical data communications between two devices for key distribution is followed by determining at 72 data regarding relative rotation between the devices. The determined rotation data is recorded into data bins at 73. The determined data recorded in the bins is then taken into account at 74 in determining how to use the optical data communications for establishing a key by selecting raw key bits and/or check bits based on the data in the bins.

Figure 8:
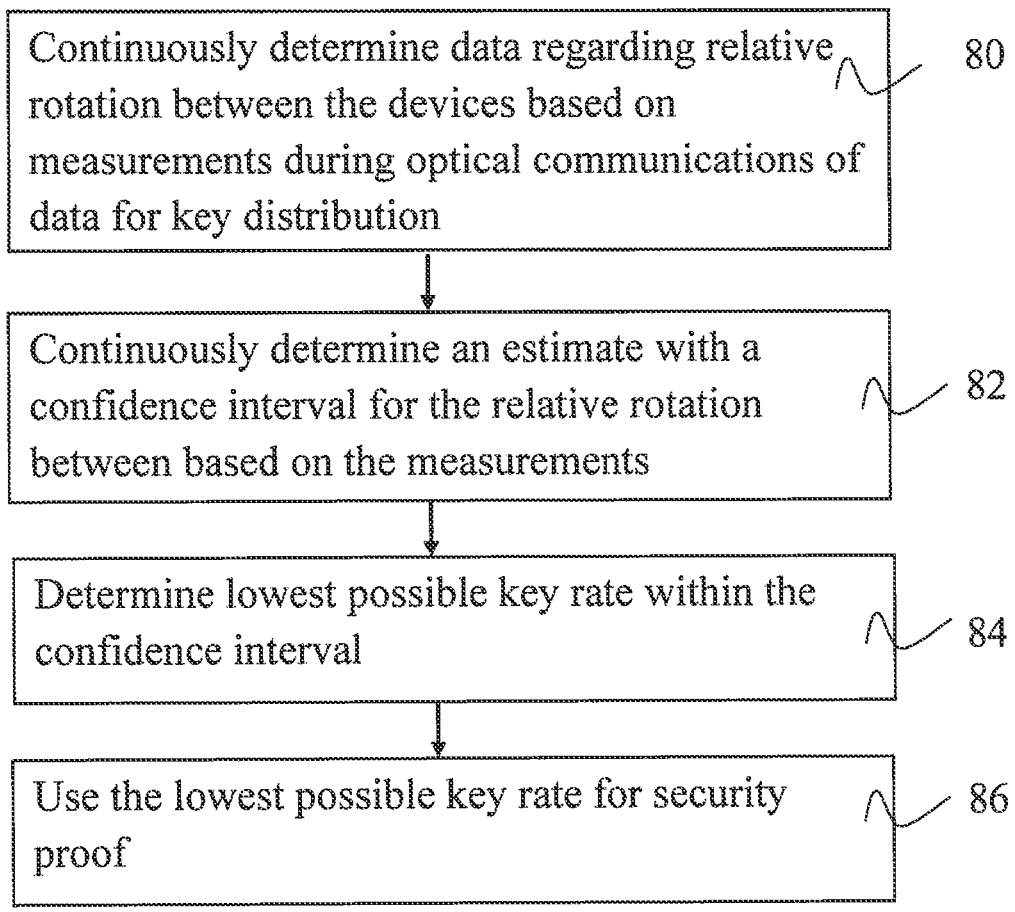

FIG. 8 is a flowchart for a mode where data regarding the relative rotation is determined continuously at 80 based on measurements in time in an arrangement where optical data is communicated between devices for key distribution. An estimate is continuously determined at 82 for the relative rotation with a confidence interval based on measurements by at least one of the devices. The lowest possible key rate within the confidence interval is determined at 84. The determined lowest possible key rate is used at 86 for security proof.

Quantum key distribution may be provided even when the reference frame is rotating faster than a typical bit repetition rate.

In accordance with an embodiment an apparatus comprises means for determining data regarding relative rotation between devices communicating data for key distribution and means for taking the determined data into account in determining how to use the optical data communications for establishing a key. Means for determining rotation of a reference frame around an axis connecting the devices may also be provided. The means for determining the relative rotation between the devices can determine the relative rotation based on the determined rotation of the reference frame. The means for taking the determined data into account may be configured to select bits from the optical data communications at least in part based on the determined data.

Means for communicating information based on at least one measurement for determining the relative rotation between the devices by at least one of the devices may also be provided. For example, the devices may be provided with radio, infrared or wired interfaces for enabling the communications.

The embodiments may be beneficial e.g. because a more reliable and efficient key distribution can be provided for arrangements where at least one of the communicating devices is mobile.

It is noted that whilst embodiments have been described using certain types of wireless systems as an example, similar principles can be applied to any other communication of data where security needs to be provided between communicating devices. Therefore, although certain embodiments were described above by way of example with reference to certain exemplifying architectures, technologies and standards, embodiments may be applied to any other suitable forms of communication systems than those illustrated and described herein.

Figure 9:
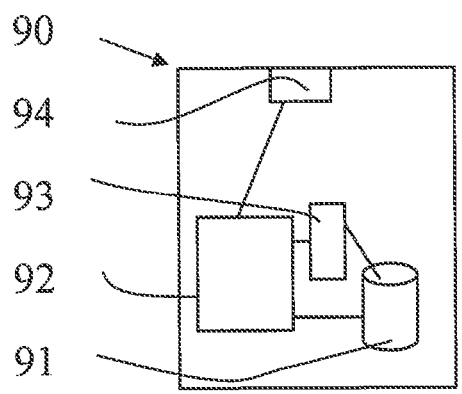
FIG. 9 shows an example of control apparatus.

Mobile devices and other communicating devices are typically controlled by at least one appropriate controller apparatus so as to enable operation thereof and control of wireless communications between the devices. The control apparatus can be interconnected with other control entities. FIG. 9 shows an example of a control apparatus 90 capable of operating in accordance with the embodiments, for example to be coupled to and/or for controlling devices 10 and 20. The control apparatus can be configured to provide control and storage functions in association with determination of various information, generation, communication and/or storage of information and/or control functions based on such information by means of the data processing facility. For this purpose the control apparatus comprises at least one memory 91, at least one data processing unit 92, 93 and an input/output interface 94. The control apparatus can be coupled to a receiver and/or transmitter of the relevant node via the interface. The control apparatus can be configured to execute an appropriate software code to provide the control functions. The control apparatus and functions may be distributed between a plurality of control units.

The required data processing apparatus, functions and circuitry at the relevant devices may be provided by means of one or more data processors and other hardware and software. The described functions may be provided by separate processors or by an integrated processor. The data processing apparatus may be of any type suitable to the local technical environment, and may include one or more of general purpose computers, special purpose computers, microprocessors, digital signal processors (DSPs), application specific integrated circuits (ASIC), gate level circuits and processors based on dual-core or multi-core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory, including appropriate types of random access memory (RAM) and read-only memory (ROM).

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, for example for controlling communications, user interface, and data processing, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD, and a cloud storage arrangement.

As used in this specification, the term circuitry refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present. This definition of circuitry applies to all uses of this term in this specification, including in any claims. As a further example, as used in this specification, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for key distribution comprising:
   initiating, at a first device, optical data communications with a second device for key distribution between the first device and the second device;
   measuring a relative rotation between the first device and the second device; and
   choosing intervals during the relative rotation for using the optical data communications for establishing a key between the first device and the second device,
   wherein measuring the relative rotation between the first device and the second device includes measuring a rotation of a reference frame around an axis connecting the first device and the second device.

2. The method according to claim 1, further comprising:
   communicating, by the first device, information based on at least one measurement of the relative rotation between the first device and the second device to the second device.

3. The method according to claim 1, further comprising:
   selecting bits from the optical data communications at least in part based on the chosen intervals during the relative rotation.

4. The method according to claim 3, wherein only bits received within a certain interval or intervals of rotational angles are selected.

5. The method according to claim 1, further comprising:
   recording relative rotation data into data bins; and
   selecting raw key bits and/or check bits based on the data in the bins.

6. The method according to claim 1, further comprising:
   continuously determining the relative rotation between the first device and the second device.

7. The method according to claim 6, further comprising:
   continuously determining an estimate for the relative rotation with a confidence interval based on measurements by at least one of the first device and the second device.

8. The method according to claim 7, further comprising:
   determining a lowest possible key rate within the confidence interval; and
   using the determined lowest possible key rate for security proof.

9. The method according to claim 1, wherein at least one of the first device and the second device is a mobile device.

10. The method according to claim 1, wherein the optical data communications for key distribution includes communication of photons for quantum key distribution.

11. An apparatus for key distribution between the apparatus and another device configured for optical data communications, the apparatus comprising:
    at least one sensor for measuring relative rotation between the apparatus and the other device;
    at least one processor; and
    at least one memory, said at least one memory including computer program code, the at least one memory and the computer program code being configured, with the at least one processor, to enable the apparatus to:
    initiate optical data communications with the other device for key distribution between the apparatus and the other device;
    measure a relative rotation between the apparatus and the other device with the at least one sensor; and
    choose intervals during the relative rotation for using the optical data communications for establishing a key between the apparatus and the other device,
    wherein to measure the relative rotation between the apparatus and the other device includes measuring a rotation of a reference frame around an axis connecting the apparatus and the other device.

12. The apparatus according to claim 11, wherein the at least one memory and the computer program code are further configured, with the at least one processor, to communicate information based on at least one measurement of the relative rotation between the apparatus and the other device to the other device.

13. The apparatus according to claim 11, wherein the at least one memory and the computer program code are further configured, with the at least one processor, to select bits from the optical data communications at least in part based on the chosen intervals during the relative rotation.

14. The apparatus according to claim 13, wherein the at least one memory and the computer program code are further configured, with the at least one processor, to select only bits received within a certain interval or intervals of rotational angles.

15. The apparatus according to claim 11, wherein the at least one memory and the computer program code are further configured, with the at least one processor, to record rotation data into data bins; and to select raw key bits and/or check bits based on the data in the bins.

16. The apparatus according to claim 11, wherein the at least one memory and the computer program code are further configured, with the at least one processor, to continuously determine the relative rotation between the apparatus and the other device.

17. The apparatus according to claim 16, wherein the at least one memory and the computer program code are further configured, with the at least one processor, to determine an estimate for the relative rotation with a confidence interval based on the measurements by at least one of the apparatus and the other device, to determine a lowest possible key rate within the confidence interval, and to use the determined lowest possible key rate for security proof.

18. The apparatus according to claim 11, wherein the at least one sensor includes at least one of an accelerometer, a magnetometer and a gyroscope.

* * * * *